Nov. 15, 1938. T. B. DOWNEY 2,136,969
APPARATUS FOR COOLING LIQUEFIED SOLIDS
Filed Aug. 14, 1937 5 Sheets-Sheet 1
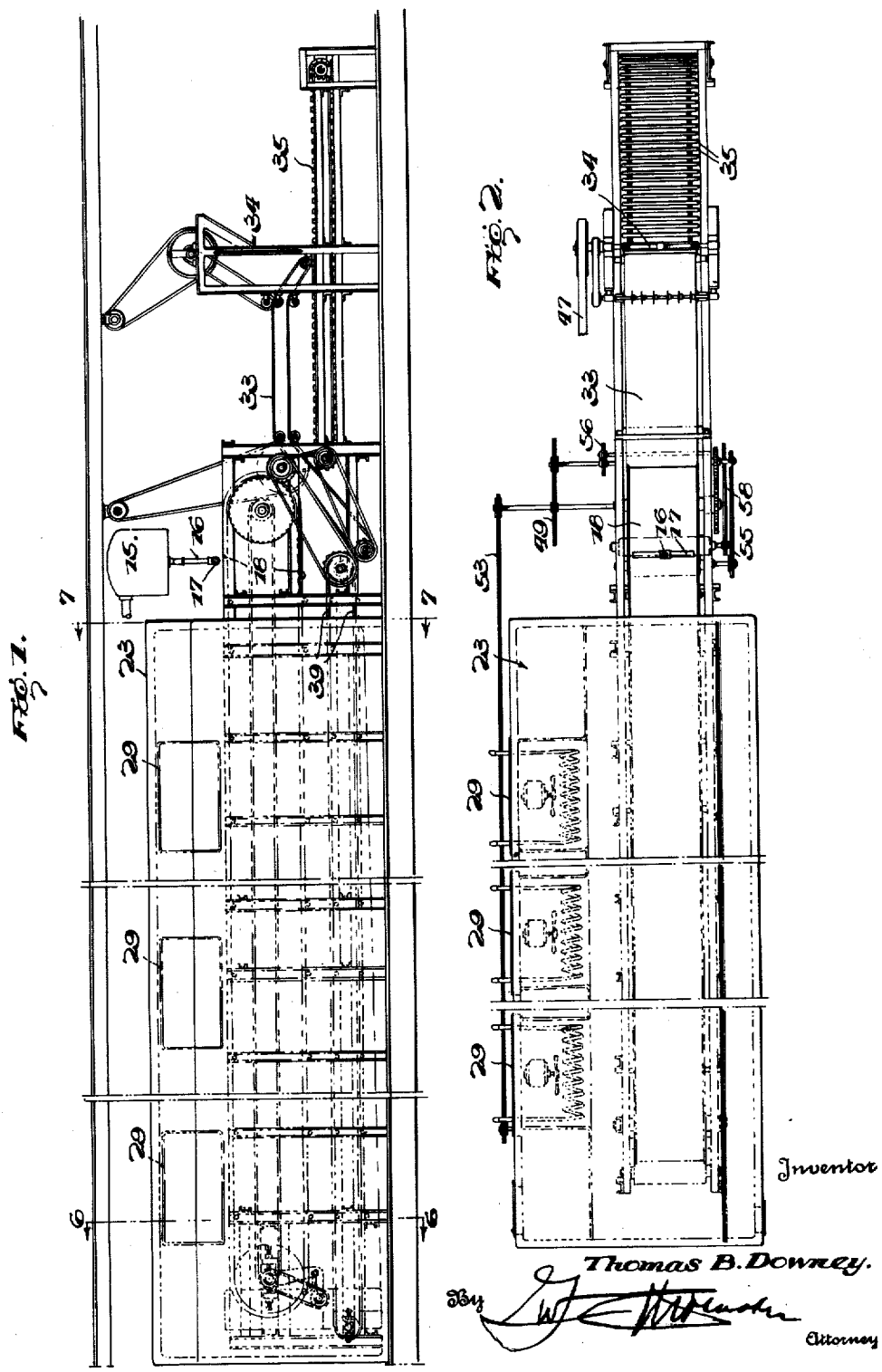
Inventor
Thomas B. Downey.
By
Attorney Nov. 15, 1938.  T. B. DOWNEY  2,136,969
APPARATUS FOR COOLING LIQUEFIED SOLIDS
Filed Aug. 14, 1937  5 Sheets-Sheet 2

Inventor
Thomas B. Downey.
By
Attorney

Nov. 15, 1938.  T. B. DOWNEY  2,136,969
APPARATUS FOR COOLING LIQUEFIED SOLIDS
Filed Aug. 14, 1937  5 Sheets-Sheet 3

Inventor
Thomas B. Downey.
Attorney

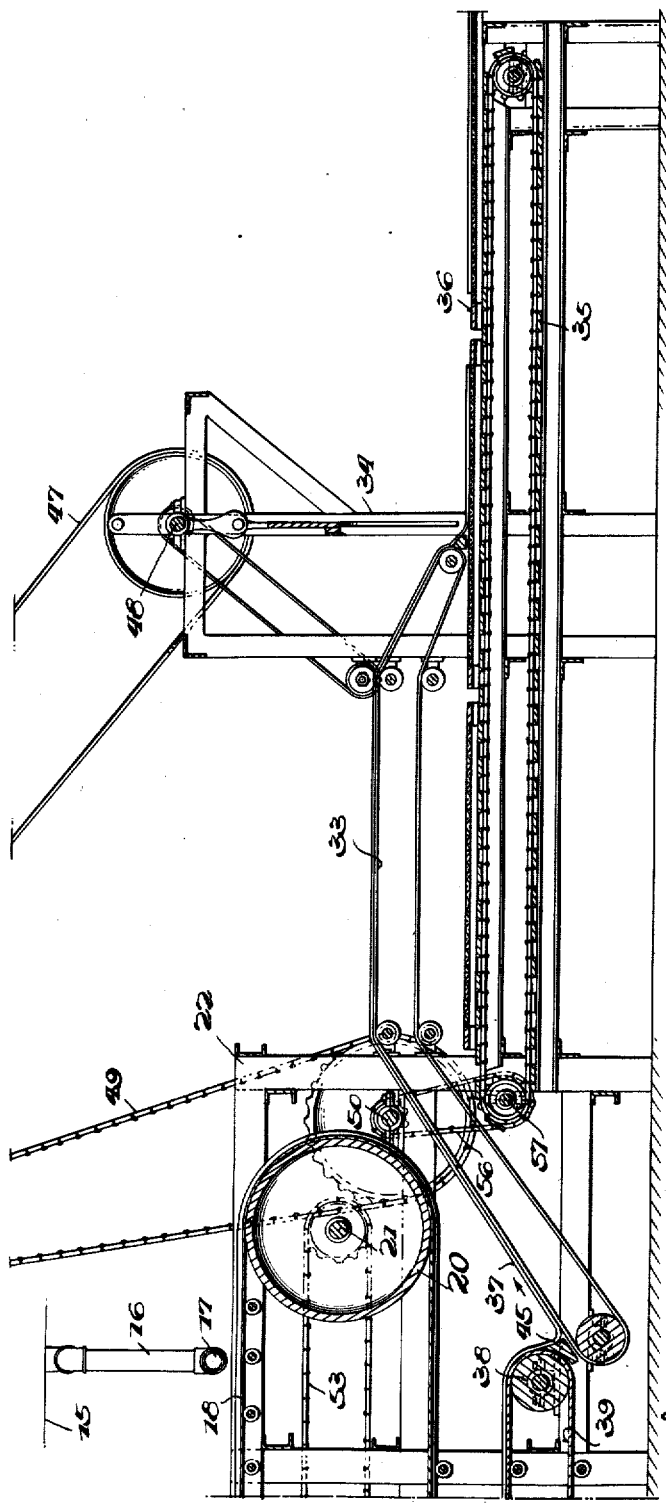

Nov. 15, 1938.  T. B. DOWNEY  2,136,969
APPARATUS FOR COOLING LIQUEFIED SOLIDS
Filed Aug. 14, 1937  5 Sheets-Sheet 5
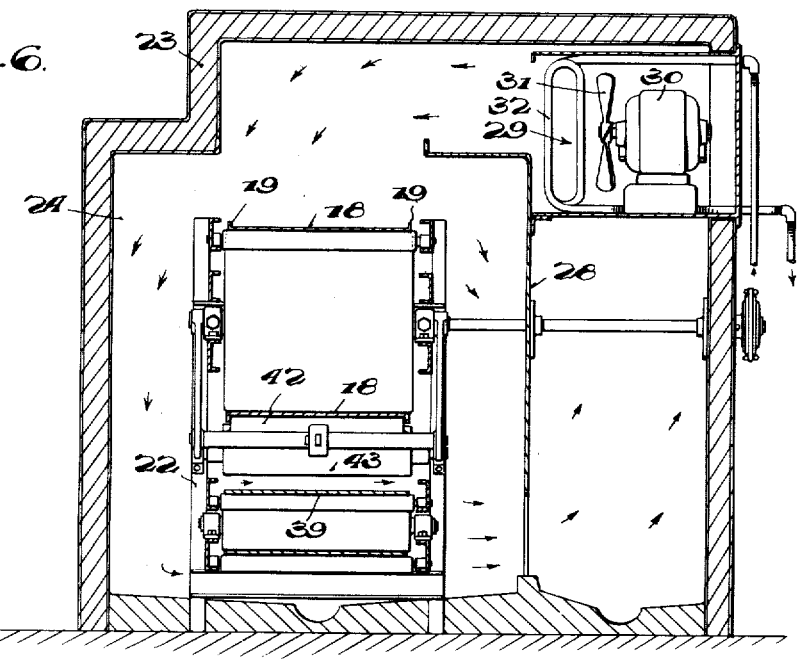
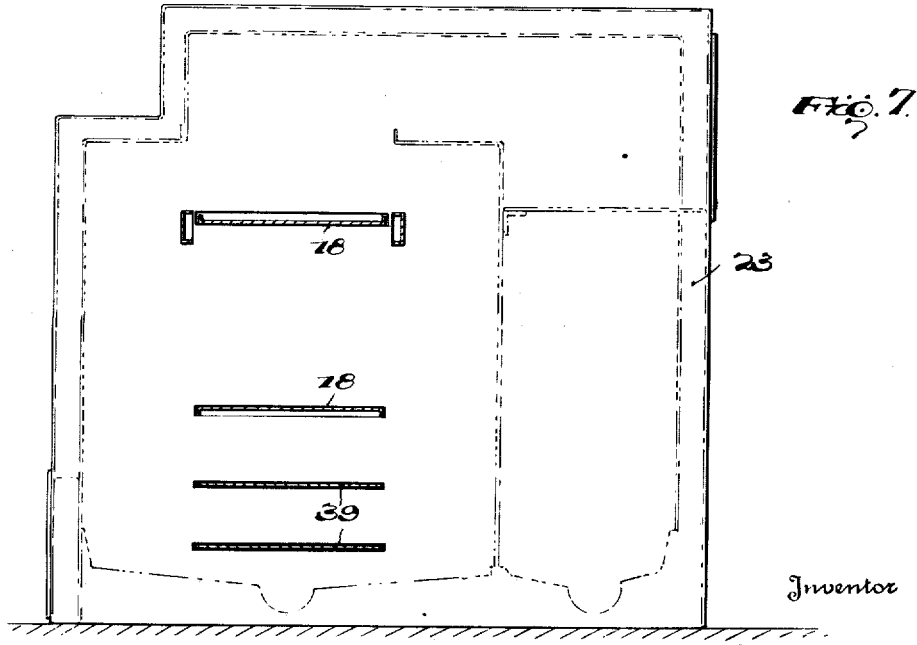

Patented Nov. 15, 1938

2,136,969

UNITED STATES PATENT OFFICE 2,136,969

APPARATUS FOR COOLING LIQUEFIED SOLIDS

Thomas Briley Downey, Haddonfield, N. J., assignor to Kind & Knox Gelatine Co., Camden, N. J., a corporation of New Jersey Application August 14, 1937, Serial No. 159,183

6 Claims. (Cl. 62—102)

The present invention relates generally to apparatus for cooling liquefied solids by means of refrigerated or chilled air in the manner set forth in the patent granted to Maurice Kind, No. 1,046,307, under date of December 3, 1912, as a consequence of which it has been the practice for many years to chill liquid gelatin, glue and similar products by depositing the same in liquid form on a moving belt and passing the same through a refrigerating chamber in order that the liquid may be more or less solidified in the form of a film for subsequent removal and transfer to drying screens.

In practice, gelatin, for example, is made from bones, skin and cartilage or tendon in the form of a dilute aqueous solution, which is then concentrated by evaporation in vacuo to such density as will congeal or jell, by proper refrigeration, to a sufficient firmness to be self-supporting on drying screens during the subsequent complete drying of the sheets to a hard brittle condition, facilitating breaking or pulverization into flakes and granules of fine grist sizes, in which, as in sheet form, gelatin is commonly sold on the market.

The apparatus of the Kind Patent No. 1,046,307 has been very commonly and extensively used in the refrigeration or chilling of the concentrated fluid prior to complete drying and, according to the practice under this patent, warm gelatin in concentrated condition is deposited upon the receiving end portion of a board, moving endless belt having flanged edges. This belt moves at a regulated speed through a refrigerated chamber in a manner insuring arrival of the material at the opposite discharge end portion of the belt chilled to a jelled film, which permits its removal by a scraper and the like and its deposit on a transfer belt adjacent to the discharge end of the refrigerated chamber. From the transfer belt, where it is separated into sheets, the sheets pass onto drying frames and the proper control and regulation of this operation ordinarily requires two attendants for placing and removing the drying frames and a third attendant to continuously check the deposit of the solution on the opposite receiving end portion of the belt, which is the length of the refrigerated chamber distant from the deposit of the chilled sheets on the drying frames, commonly a matter of from sixty to one-hundred feet. As the solution chills and congeals in the refrigerated chamber into a film, it rapidly acquires a tough skin upon its upper exposed surface, which, being a very poor conductor of heat, acts of itself to defeat desired uniform refrigeration throughout the entire thickness of the film. As a consequence, the under-surface of the film, lying against and protected by the belt, remains relatively soft and is very likely to maintain such a tender condition that when applied to the drying frames it is likely to sag on the wires of these frames and to encompass such wires. The result is that all too often the final dried product is a sheet having one surface which is marred by the prints of the wires and is frequently difficult of removal therefrom after drying.

It is, therefore, very difficult under the present practice to avoid a final dried product having a rough, uneven surface, and this is a great disadvantage where the gelatin is sold either in sheets, large pieces or flakes because in such instances brilliant and even surfaces are highly desirable.

Many attempts have been made to avoid these disadvantages, most of them directed to lowered temperatures, lengthened belts and refrigerated chambers or compartments, and substantial slowing of belt speed with consequent slowing up of the entire operation. Without exception, however, all such attempts merely substitute their own obvious disadvantages for the beforementioned disadvantages which they seek to avoid.

It is for the foregoing reasons the primary object of the present invention, to bring about delivery of the congealed, refrigerated film at the delivery end of the refrigerated chamber or compartment in a substantially uniformly chilled condition throughout its thickness, and it is in particular the aim of the invention in this respect to deliver the refrigerated film with both surfaces thereof having similar tough skins, capable of supporting severed sheets of the film on the drying frames without danger of sagging and with the assurance of a final product having equally brilliant, smooth surfaces when completely dried.

It is also an object of the invention to accomplish the above without resorting to the lowering of temperatures, the lengthening of belts and refrigerated chambers, the slowing up of the operation, or otherwise utilizing anything presenting its individual disadvantage. On the contrary the invention aims to accomplish the desired result by means of an apparatus which will promote operating advantages in addition to an improved final product.

Among its further objects the invention aims to permit deposit of the solution for refrigeration, in the very first instance upon an end portion of the refrigerating belt, at the same end of the refrigerating chamber or compartment as that where the uniformly chilled film is subsequently removed and transferred to the drying frames, so that the operators or attendants necessary for placing and removing the drying frames will be in position to continuously check the flow of fluid material on to the belts in addition to their other duties, so as to avoid the necessity for a third attendant.

A still further object of the invention is to bring about uniform refrigeration or chilling of the solution into film form, and its subsequent discharge with tough surface skins, without having in the meantime contacted outside warm air, whereby the product as placed in sheets on the drying frames will insure against absorption of impurities from the air and will thus present a substantial improvement from a sanitary standpoint.

With the above general statement of the previously known and used practice, and the objects of the present improvements, the manner in which the invention proceeds towards the desired end and, in particular, the apparatus by which it is carried out will be readily understood and thoroughly appreciated from the following detailed description thereof, reference being made to the accompanying drawings, which form a part of this specification, and in which:

Figure 1 is a side elevation of the complete apparatus;

Figure 2 is a top plan view thereof;

Figure 3:
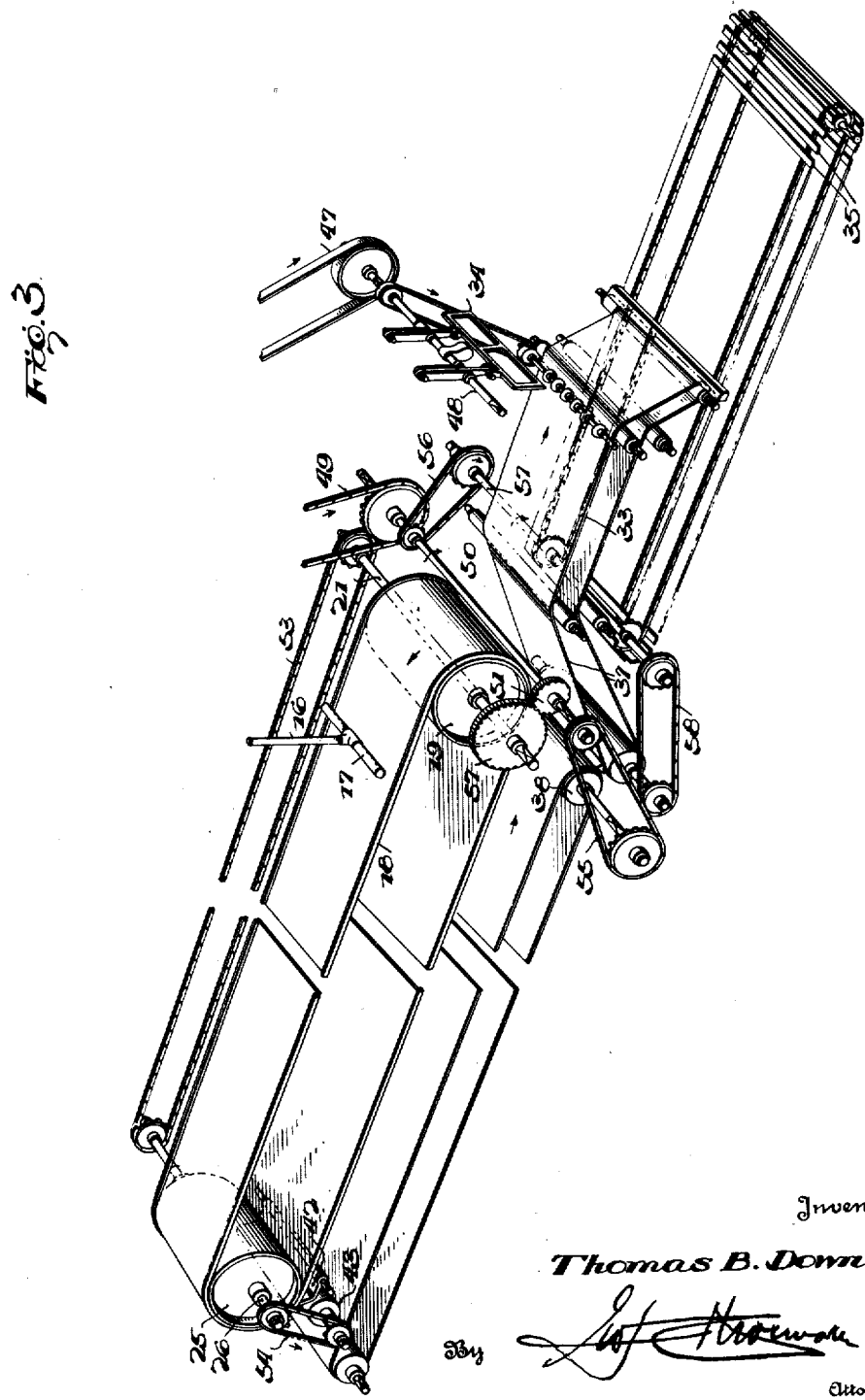
Figure 3 is a perspective view, more or less diagrammatic, showing the several operating parts involved in the deposit, manipulation and removal of the refrigerated product, with the refrigerating chamber and its necessary features removed.

Figure 5 is a similar view through that portion of the present apparatus extending beyond the discharged end of the refrigerating chamber; and Figures 6 and 7 are vertical transverse sectional views through the refrigerating device, taken, respectively, on lines 6—6 and 7—7 of Figure 1.

Referring now to these figures and particularly to Figures 1, 2, 4 and 5, it will be noted that in the practice of the invention the concentrated solution is fed from what may be a preliminary cooling tank 15 (Figure 1) through a feed pipe 16, the horizontal perforate member 17 of which extends transversely across the upper run of an endless belt 18 having, as best seen in Figures 6 and 7, flanges 19 along its longitudinal side edges.

The belt 18, adjacent to the above-mentioned point of deposit of the concentrated and partially cooled fluid, passes around a roller 20 mounted on a shaft 21 having suitable bearings in a frame generally indicated at 22, at what is in the present instance both the receiving and discharge end of the elongated refrigerator housing 23.

Figure 4:
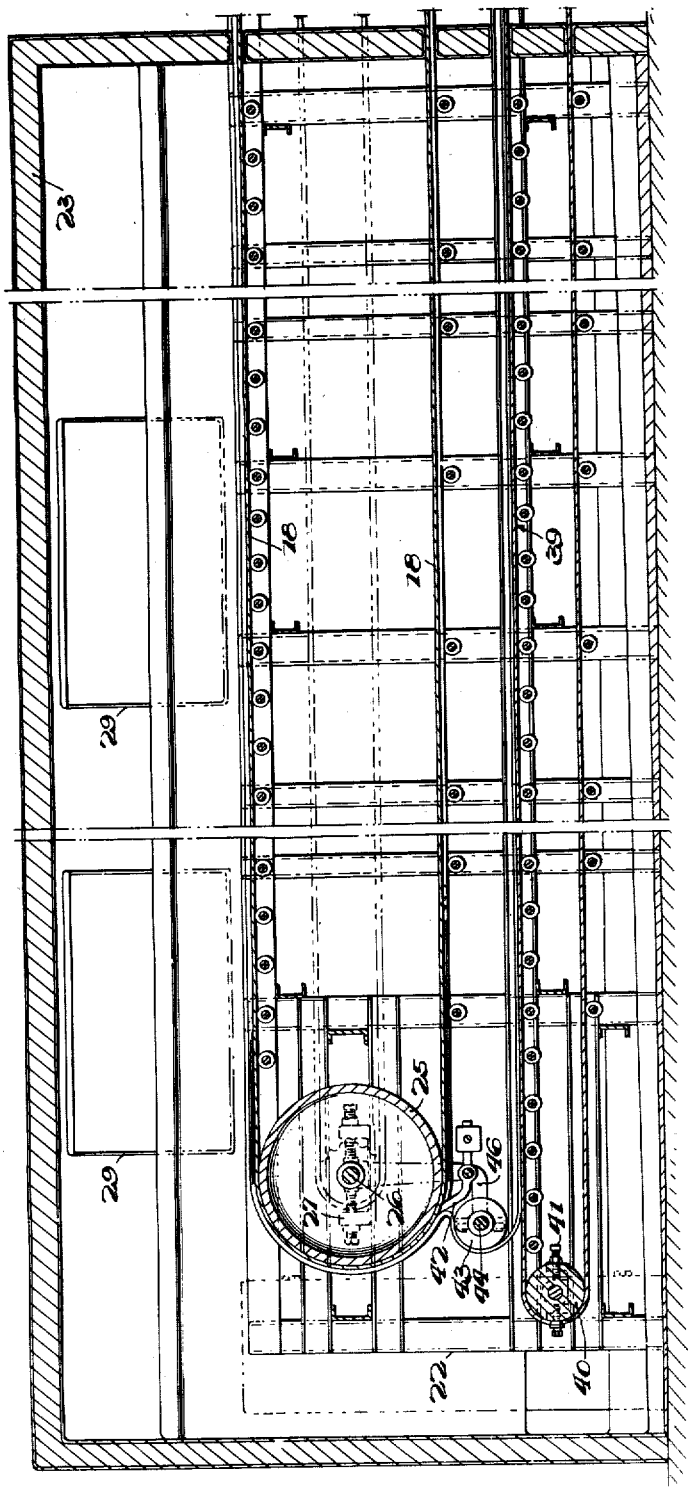
Figure 4 is a vertical longitudinal sectional view taken through the refrigerating chamber and the parts of the invention housed therein.

As will be seen by a comparison of Figures 4, 6 and 7, in particular, the housing 23 forms therein a refrigerating chamber 24 lengthwise thereof, which is, in operation, completely closed at its opposite end, and lengthwise of which portions of the frame 22 extend for the support of the necessary parts incidental to the refrigeration of the material as it passes through the chamber.

Thus, within the chamber 24 adjacent to the opposite closed end of the refrigerated housing 23, there is supported in the frame 22 a roller 25, around which the other end portion of belt 18 is trained, this latter roller being mounted on a shaft 26 which is adjustable horizontally in bearings 27, so that any stretch in the belt 18 may be taken up from time to time.

Within the refrigerating chamber 24 and at one side of the supporting framework 22 is an upright longitudinally disposed baffle plate 28 spaced at its upper edge from the top of the chamber and at its lower edge from the bottom of the chamber, to provide passageways for the circulation of air transversely of the chamber at a plurality of points therealong incident to the operation of independent refrigerating units, generally indicated at 29, and each including a motor 30 and fan or blower 31, the latter forcing air through a refrigerating coil 32 above the baffle wall. The air thus refrigerated passes over the baffle wall 28 and downwardly upon the solution which has previously been deposited upon the belt 18 and which, immediately upon such deposit, has flowed over the surface of the belt 18 between its flanged sides 19. Thus the full effect of the refrigerated air takes immediate effect upon the upper exposed surface of the solution, and the latter quickly acquires a tough surface skin as the upper run of the belt passes rearwardly in the refrigerating chamber toward the inner roller 25.

The air then passes downwardly below the lower run of belt 18 and laterally toward the space beneath the baffle wall 28, and thence upwardly for recirculation and recooling in the refrigerating units 29.

It is obvious from the foregoing that the solution receiving end of the chilling belt 18 projects beyond the forward end of the refrigerated housing 23, which, according to the present invention, is both the receiving and discharge end of this housing, the deposit of the fluid material being at a point above and adjacent to a transfer belt 33 extending forwardly beneath a film cutting apparatus generally indicated at 34, so that the sheets cut from the chilled or refrigerated film may be deposited upon a lower horizontal belt 35, on which drying frames 36 are successively placed and removed by attendants who thus operate in the immediate vicinity of the intial deposit of the fluent material on the belt 18 and are in position to check the proper feed of this material from the feed pipes 16, 17 at all times.

Both the transfer belt 33 and the drying frame belt 35 are of the endless type as shown, and, as particularly seen in Figure 5, the transfer belt 33, as is common in the art, has a forwardly inclined portion adjacent to the cutting mechanism 34 and immediately above the drying frames 36 on the belt conveyor 35. According to the present invention, the transfer belt 33 also has an inclined rear portion 37, whose rear end is beneath the forward roller 38 of a second chilling belt 39. This chilling belt 39, according to the present invention, extends rearwardly within the refrigerated housing 23 to a point rearwardly beyond the rear roller 25 of the chilling belt 18, and as particularly seen in Figure 4 the upper run of belt 39 is parallel with the belt 18 in its spaced relation beneath the same, and its rear end is trained around a roller 40 mounted in adjustable brackets at 41, whereby any undesirable looseness of the belt may be taken up from time to time.

According to the invention, the film of partially congealed material, traveling upon the upper run of belt 18, and subject as previously described to the refrigerated air from the several refrigerating units 29, is taken off of this belt at the lower rear portion of the rear roller 25, by means of a scraper or doctor, as best seen at 42 in Figure 4. Below and at the rear of the doctor 42 is a transfer roller 43, rotating upon a shaft 44 and located in the space between the rear roller 26 of belt 18 and the upper run of the second, lower chilling belt 39, so that the material or film scraped from the belt 18 at the lower portion of its rear roller 25 is guided and supported by the surface of the transfer roller 43 in its passage downwardly upon the chilling belt 39.

Thus the film, which has, in the course of its movement along the belt 18, acquired a tough skin upon its upper surface exposed to the refrigerating air, is removed from the inner end of this belt and in its transfer it is laid upon the oppositely moving lower chilling belt with its tough skin surface next to the belt surface and its relatively soft surface, previously protected by belt 18, lying uppermost so that it will in its movement along the reversely traveling belt 39 be subject to the chilling influence of the refrigerated air and will acquire upon this surface a tough, slick skin, the same as previously acquired upon its opposite surface on belt 18.

The result is that upon movement of the film to the forward discharge end of the lower or second chilling belt 39, the film may be taken off at the forward roller 18 as by means of a scraper block 45 shown in Figure 5 and deposited upon the rear inclined portion of the transfer belt or conveyor 33 with two tough, slick skin surfaces, whereby, as exposed to the warm outside air, the absorption of impurities is successfully prevented, and from the standpoint of sanitation the final product will, for this reason, be substantially benefited. Moreover, having a tough, slick lower skin surface, the film when cut and laid on the drying frames 36 will be in a condition to effectively obviate sagging and encompassing the frame wires, and a final product will be assured, having both surfaces of the dried sheets similarly brilliant and even.

The above is especially true since it is apparent that the film in its passage along the belt 18 is chilled for the major portion of its thickness from its upper surface and, when transferred and reversed upon the lower chilling belt 39 for return movement, it is similarly subjected to a chilling action through the major portion of its thickness from the opposite surface and edges thereof. It is thus assured that upon final discharge from the forward receiving and discharging end of the refrigerated casing or housing, the film of gelatin, glue or other material will be completely refrigerated, that is, chilled through for its full thickness.

In transferring the film from the upper chilling belt 18 and reversing the film upon the lower belt 39, the transfer and guide roller 43 plays an important function in supporting the then incompletely chilled film in a condition where the unsupported weight of that portion of the film between the two belts would bring about excessive stretching of the film. With the roller 43 placed as shown and described, to support the weight of that portion of the film between the upper and lower belts, excessive stretching is entirely avoided and regulation of the speed of the lower belt with respect to that of the upper belt will compensate for the slight uniform stretch of the film in its transfer.

It will be noted from Figure 4 that the shaft 44 of the transfer and guide roller 42 is mounted upon brackets 46, which depend from the adjustable bearing mounting of the shaft 26 of the rear roller 25, so that the said roller 43 and the scraper or doctor 42 also carried by the brackets 46 will be adjusted as a unit whenever it is necessary to take up the normal stretch of the belt 18.

It is especially to be noted and may be plainly seen from an inspection of Figure 4 that except for the forward end portions of the upper and lower belts 18 and 39, these belts operate wholly within the refrigerated casing or housing 23 and that the transfer of the film from the upper belt 18 to the lower belt 39 at the inner ends of these belts adjacent to the rear end of the casing 23 takes place wholly within the refrigerated area so that, after deposit of the liquid solids upon the upper belt 18 and the passage thereof into the refrigerated casing, the film is continuously subjected to the action of the refrigerated air within the housing and does not again come in contact with the outside warm air until it emerges at the discharge end of the lower belt 39 with both surfaces and edges thereof tough, slick, and highly resistant to impurities in the air. Films of gelatin evolved in this condition permit higher drying temperature without sagging, as well as higher relative humidity in the subsequent drying apparatus, which is an important consideration in summer in humid weather and also desirable in winter for heat economy.

Attention has previously been called to the fact that the arrangement proposed by the present invention situates the feed of liquid solids to the receiving end of the upper chilling belt at the same end of the casing as that at which the film is finally taken from the discharge end of the lower belt 39, so that the attendants necessarily present for placing and removing the drying frames at the forward end of the apparatus are conveniently in position to maintain a continuous check upon the proper feed of the liquid solids. This same arrangement not only effects the foregoing economy in the operation of the apparatus but permits, in many instances, of material reduction in the present lengths of the chilling belts and the refrigerated casing or housing 23 and tends to material economy in floor space, permitting the use of the present apparatus in buildings where it was previously impossible to use the necessary lengthy apparatus previously employed in the art under the abovementioned Kind Patent.

As far as the means for moving the several parts are concerned, in the operation of the apparatus, particular attention is called to Figure 3 of the drawings. Power may be led separately through a belt 47 to a shaft 48 for the operation of the cutting mechanism 34 apart from the remainder of the apparatus. Power may be similarly led through a belt 49 to a cross shaft 50 and through connecting gears 51 and 52, to the shaft 21 of the forward roller 19 of the upper chilling belt 18. Shaft 21 may be connected by a chain and sprocket connection 53 with the shaft 26 of the rear roller 25 of belt 18, and from one end of this shaft 26 it is preferable that the transfer and guide roller 43 be driven through a sprocket and chain connection at 54, so that movement of this roller may be made to coincide precisely as to surface speed with that of the belt 18. For substantially the above reason, the forward roller 38 of the lower belt 39 may be driven by a sprocket and chain connection 59 from the beforementioned cross shaft 50, and power may be taken from this shaft 50 through a sprocket and chain connection 56 to the rear shaft 57 of the drying frame belt or conveyor 35, the opposite end of which shaft 57 may be connected by a sprocket and chain connection 58 with the lower rear shaft roller of the transfer conveyor 33. Thus movement of the lower chilling belt 39 may be readily synchronized as to surface speed with the movement of the transfer conveyor 33 and that of the screen frame conveyor 35, and any necessary difference in speed between the movement of these parts and that of the upper belt 18 and the transfer and guide roller 43 may be readily provided for.

What is claimed is:

1. An apparatus for cooling liquefied solids and congealing the same into a continuous film having similarly tough skin surfaces, comprising a refrigerating casing, means for circulating and refrigerating air within the casing, a belt conveyor on the receiving end of which liquefied solids settle in the form of a film, said conveyor traversing the casing for gradually moving therewith the film of liquefied solids through the refrigerated area whereby the upper exposed surface of the film becomes chilled and a tough skin is thus formed on said surface, a second conveyor traversing the casing, and means for guiding the film from the discharge end of the first conveyor onto the receiving end of the second conveyor with the chilled skin surface of the film against the second conveyor belt and its opposite surface and edges exposed for the chilling thereof and the formation of a tough skin surface thereon.

2. An apparatus for cooling liquefied solids and congealing the same into a continuous film having similarly tough skin surfaces, comprising a casing, means for refrigerating the area within the casing, a belt conveyor within the casing, having a receiving end adapted to the reception of liquefied solids and the settling of such solids in the form of a film thereon, said conveyor serving to carry such film of solids within the refrigerated zone for chilling the film and forming a tough skin on the upper exposed surface of the film, a second conveyor within the refrigerated zone of the casing, and means for guiding the film from the discharge end of the first conveyor onto the receiving end of the second conveyor with the chilled skin surface of the film against the second conveyor and its opposite surface and edges exposed for chilling thereof in the formation of a tough skin thereon, said guiding means including means movable with the film for sustaining the weight of the latter during its transfer from the first to the second conveyor.

3. An apparatus for cooling liquefied solids and congealing the same into a continuous film having similarly tough skin surfaces, comprising a casing, means for refrigerating the area within the casing, a belt conveyor within the casing, having a receiving end adapted to the reception of liquefied solids and the settling of such solids in the form of a film thereon, said conveyor serving to carry such film of solids within the refrigerated zone for chilling the film and forming a tough skin on the upper exposed surface of the film, a second conveyor within the refrigerated zone of the casing, and means for stripping the film from the discharge end of the first conveyor and supporting and guiding the film onto the receiving end of the second conveyor with the chilled skin surface of the film against the second conveyor belt and its opposite surface and edges exposed for chilling thereof and the formation of a tough skin thereon.

4. An apparatus for cooling liquefied solids and congealing the same into a continuous film having a tough skin over all surfaces thereof, comprising a refrigerated casing, a belt conveyor therein having a material receiving end projecting exteriorly through the front of the casing and adapted to the reception of liquefied solids and the settling of such solids in the form of a film thereon, said conveyor serving to carry such film of solids within the refrigerated zone of the casing for gradually chilling the film thereon and forming a tough skin on the upper exposed surface of the film, a second conveyor within the casing below the first conveyor and moving in a direction opposite thereto with its receiving end below the discharge end of the first conveyor and its discharge end projecting exteriorly through the front of the casing below and adjacent to the said receiving end of the first conveyor, and means within the casing for guiding the film from the discharge end of the first conveyor onto the receiving end of the second conveyor with the chilled surface of the film against the second conveyor and the other surface and side edges of the film exposed during movement on the second conveyor for chilling thereof and the formation of a tough skin thereon.

5. An apparatus for cooling liquefied solids and congealing the same into a continuous film having a tough skin over all surfaces thereof, comprising a refrigerated casing, a belt conveyor therein having a material receiving end projecting exteriorly through the front of the casing and adapted to the reception of liquefied solids and the settling of such solids in the form of a film thereon, said conveyor serving to carry such film of solids within the refrigerated zone of the casing for gradually chilling the film thereon and forming a tough skin on the upper exposed surface of the film, a second conveyor within the casing below the first conveyor and moving in a direction opposite thereto with its receiving end below the discharge end of the first conveyor and its discharge end projecting exteriorly through the front of the casing below and adjacent to the said receiving end of the first conveyor, means within the casing for guiding the film from the discharge end of the first conveyor onto the receiving end of the second conveyor with the chilled surface of the film against the second conveyor and the other surface and side edges of the film exposed during movement on the second conveyor for chilling thereof and the formation of a tough skin thereon, said guiding means including a stripper operating in connection with the first conveyor for insuring release of the film therefrom, and a means having a surface movable with the moving film for sustaining the weight of the film in the course of its transfer between the conveyors.

6. An apparatus for cooling liquefied solids and congealing the same into a continuous film having a tough skin over all surfaces thereof, comprising a refrigerated casing, a belt conveyor therein having a material receiving end projecting exteriorly through the front of the casing and adapted to the reception of liquefied solids and the settling of such solids in the form of a film thereon, said conveyor serving to carry such film of solids within the refrigerated zone of the casing for gradually chilling the film thereon and forming a tough skin on the upper exposed surface of the film, a second conveyor within the casing below the first conveyor and moving in a direction opposite thereto with its receiving end below the discharge end of the first conveyor and its discharge end projecting exteriorly through the front of the casing below and adjacent to the said receiving end of the first conveyor, means within the casing for guiding the film from the discharge end of the first conveyor onto the receiving end of the second conveyor with the chilled surface of the film against the second conveyor and the other surface and side edges of the film exposed during movement on the second conveyor for chilling thereof and the formation of a tough skin thereon, said guiding means including a roller below the discharge ends of the first conveyor and between the same and the receiving end of the second conveyor, rotating with the first conveyor for supporting the film in the course of its transfer between the conveyors.

THOS. B. DOWNEY.

CERTIFICATE OF CORRECTION.

Patent No. 2,136,969. November 15, 1938.

THOMAS BRILEY DOWNEY.

It is hereby certified that error appears in the printed specification of the above numbered patent requiring correction as follows: Page 1, first column, line 32, for "board" read broad; page 3, second column, line 6, for the reference numeral "42" read 43; page 4, first column, line 4, for "59" read 55; and line 24, claim 1, for "refrigerating" read refrigerated; and that the said Letters Patent should be read with this correction therein that the same may conform to the record of the case in the Patent Office.

Signed and sealed this 27th day of December, A. D. 1938.

(Seal)

Henry Van Arsdale
Acting Commissioner of Patents.

and the settling of such solids in the form of a film thereon, said conveyor serving to carry such film of solids within the refrigerated zone of the casing for gradually chilling the film thereon and forming a tough skin on the upper exposed surface of the film, a second conveyor within the casing below the first conveyor and moving in a direction opposite thereto with its receiving end below the discharge end of the first conveyor and its discharge end projecting exteriorly through the front of the casing below and adjacent to the said receiving end of the first conveyor, means within the casing for guiding the film from the discharge end of the first conveyor onto the receiving end of the second conveyor with the chilled surface of the film against the second conveyor and the other surface and side edges of the film exposed during movement on the second conveyor for chilling thereof and the formation of a tough skin thereon, said guiding means including a roller below the discharge ends of the first conveyor and between the same and the receiving end of the second conveyor, rotating with the first conveyor for supporting the film in the course of its transfer between the conveyors.

THOS. B. DOWNEY.

CERTIFICATE OF CORRECTION.

Patent No. 2,136,969. November 15, 1938.

THOMAS BRILEY DOWNEY.

It is hereby certified that error appears in the printed specification of the above numbered patent requiring correction as follows: Page 1, first column, line 32, for "board" read broad; page 3, second column, line 6, for the reference numeral "42" read 43; page 4, first column, line 4, for "59" read 55; and line 24, claim 1, for "refrigerating" read refrigerated; and that the said Letters Patent should be read with this correction therein that the same may conform to the record of the case in the Patent Office.

Signed and sealed this 27th day of December, A. D. 1938.

(Seal)

Henry Van Arsdale
Acting Commissioner of Patents.